United States Patent
Lowrie

(10) Patent No.: US 12,473,024 B2
(45) Date of Patent: Nov. 18, 2025

(54) SYSTEMS AND METHODS FOR OVER LEARNING PROTECTION FOR TORQUE STEER MITIGATION

(71) Applicant: STEERING SOLUTIONS IP HOLDING CORPORATION, Saginaw, MI (US)

(72) Inventor: Bruce E. Lowrie, Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 54 days.

(21) Appl. No.: 18/626,857

(22) Filed: Apr. 4, 2024

(65) Prior Publication Data
US 2024/0246606 A1 Jul. 25, 2024

Related U.S. Application Data

(63) Continuation of application No. 17/708,626, filed on Mar. 30, 2022, now Pat. No. 11,975,777.
(Continued)

(51) Int. Cl.
*B60W 60/00* (2020.01)
*B62D 6/10* (2006.01)

(52) U.S. Cl.
CPC ...................... *B62D 6/10* (2013.01)

(58) Field of Classification Search
CPC ................. B60W 50/00; B62D 6/10
See application file for complete search history.

(56) References Cited

U.S. PATENT DOCUMENTS

2008/0047775 A1 2/2008 Yamazaki
2008/0147276 A1* 6/2008 Pattok ...................... B62D 6/04
701/42
(Continued)

FOREIGN PATENT DOCUMENTS

CN 101134471 A 3/2008
CN 109153408 A 1/2019
(Continued)

OTHER PUBLICATIONS

German Patent and Trademark Office, Dec. 3, 2024, Official Letter for corresponding DE application No. 10 2022 107 829.9, 3 pgs., English language translation—3 pgs.
(Continued)

*Primary Examiner* — Long T Tran
(74) *Attorney, Agent, or Firm* — Dickinson Wright PLLC

(57) ABSTRACT

A method for providing over learn protection for torque steer mitigation includes receiving a compensation torque value corresponding to a torque offset associated with a transmission torque and receiving a handwheel torque value associated with a handwheel of a steering system. The method also includes detecting a mathematical sign of the compensation torque value, detecting a mathematical sign of the handwheel torque value, and determining whether the mathematical sign of the compensation torque value is the same as the mathematical sign of the handwheel torque value. The method also includes, in response to a determination that the mathematical sign of the compensation torque value is not the same as the mathematical sign of the handwheel torque value, adjusting one or more learned gains, and generating an inverted compensation torque value by inverting the mathematical sign of the compensation torque value.

20 Claims, 5 Drawing Sheets

Related U.S. Application Data

(60) Provisional application No. 63/170,109, filed on Apr. 2, 2021.

(56) References Cited

U.S. PATENT DOCUMENTS

| | | | |
|---|---|---|---|
| 2013/0030602 A1* | 1/2013 | Joeng | B60W 30/12 |
| | | | 701/1 |
| 2015/0151784 A1* | 6/2015 | Moretti | B62D 15/024 |
| | | | 701/41 |
| 2015/0329141 A1* | 11/2015 | Preijert | B62D 6/008 |
| | | | 701/41 |
| 2016/0288825 A1 | 10/2016 | Varunjikar et al. | |
| 2017/0158226 A1* | 6/2017 | Lee | B62D 5/0463 |
| 2018/0086371 A1* | 3/2018 | Wang | B62D 6/00 |
| 2018/0134311 A1* | 5/2018 | Carriazo-Rabadán | |
| | | | B62D 5/0457 |
| 2020/0117950 A1* | 4/2020 | Thompson | B60W 60/001 |
| 2021/0206383 A1* | 7/2021 | Teng | B60W 50/0098 |

FOREIGN PATENT DOCUMENTS

| | | |
|---|---|---|
| CN | 112109799 A | 12/2020 |
| DE | 102012019235 A1 | 4/2014 |
| DE | 102008057313 B4 | 3/2018 |
| DE | 102020118419 A1 | 2/2021 |
| DE | 102020208261 B4 | 4/2022 |
| DE | 102021202740 A1 | 9/2022 |
| JP | 2012076657 A | 4/2012 |

OTHER PUBLICATIONS

China Patent and Trademark Office, Jan. 25, 2025, Office Action and Search Report for corresponding application No. 2025012500049500, 11 pgs., English language translation—16 pgs.

* cited by examiner

SYSTEMS AND METHODS FOR OVER LEARNING PROTECTION FOR TORQUE STEER MITIGATION

CROSS-REFERENCES TO RELATED APPLICATIONS

This U.S. Continuation Patent Application claims priority to U.S. Utility patent application Ser. No. 17/708,626, filed Mar. 30, 2022, which claims priority to U.S. Provisional Patent Application Ser. No. 63/170,109, filed Apr. 2, 2021, each of which are incorporated herein by reference in their entirety.

TECHNICAL FIELD

This disclosure related to steering systems, and in particular to systems and methods for over learning protection for torque steer mitigation.

BACKGROUND

Vehicles, such as cars, trucks, sport utility vehicles, crossovers, mini-vans, marine craft, aircraft, all-terrain vehicles, recreational vehicles, or other suitable vehicles, include a steering system, such as an electronic power steering (EPS) system, a steer-by-wire (SbW) steering system, a hydraulic steering system, or other suitable steering system. The steering system typically includes various torque paths for providing torque to various components of the steering system.

Typically, such steering systems may include or use one or more torque steering mitigation functions. Such torque steering mitigation functions may have calibrations set to quickly learn, which may allow for such torque steer mitigation functions to compensate for torque offsets due to transmission torque relatively quickly. However, this can cause the torque steer mitigation function to "over learn" on consecutive key cycles, because the learned gain may be stored as a 'long term gain' and on new key cycles, a 'short term gain' is learned (e.g., the gain of transmission torque to handwheel torque offset learned may become increase to an undesirable value). This can induce a pulling effect, which may be experienced by the operator of a vehicle in the opposite direction.

SUMMARY

This disclosure relates generally to steering systems.

An aspect of the disclosed embodiments includes a method for providing over learn protection for torque steer mitigation. The method includes receiving a compensation torque value corresponding to a torque offset associated with a transmission torque and receiving a handwheel torque value associated with a handwheel of a steering system. The method also includes detecting a mathematical sign of the compensation torque value, detecting a mathematical sign of the handwheel torque value, and determining whether the mathematical sign of the compensation torque value is the same as the mathematical sign of the handwheel torque value. The method also includes, in response to a determination that the mathematical sign of the compensation torque value is not the same as the mathematical sign of the handwheel torque value, adjusting one or more learned gains, and generating an inverted compensation torque value by inverting the mathematical sign of the compensation torque value.

Another aspect of the disclosed embodiments includes a system for providing over learn protection for torque steer mitigation. The system includes a processor and a memory. The memory includes instructions that, when executed by the processor, cause the processor to: receive a compensation torque value corresponding to a torque offset associated with a transmission torque; receive a handwheel torque value associated with a handwheel of a steering system; detect a mathematical sign of the compensation torque value; detect a mathematical sign of the handwheel torque value; determine whether the mathematical sign of the compensation torque value is the same as the mathematical sign of the handwheel torque value; in response to a determination that the mathematical sign of the compensation torque value is not the same as the mathematical sign of the handwheel torque value: adjust one or more learned gains; and generate an inverted compensation torque value by inverting the mathematical sign of the compensation torque value.

Another aspect of the disclosed embodiments includes an apparatus for providing over learn protection for torque steer mitigation. The apparatus includes a processor and a memory. The memory includes instructions that, when executed by the processor, cause the processor to: receive a compensation torque value corresponding to a torque offset associated with a transmission torque; receive a handwheel torque value associated with a handwheel of a steering system; detect a mathematical sign of the compensation torque value; detect a mathematical sign of the handwheel torque value; determine whether the mathematical sign of the compensation torque value is the same as the mathematical sign of the handwheel torque value; in response to a determination that the mathematical sign of the compensation torque value is not the same as the mathematical sign of the handwheel torque value: adjust one or more learned gains; generate an inverted compensation torque value by inverting the mathematical sign of the compensation torque value; generate a torque command based on the inverted compensation torque value and the handwheel torque value; and selectively control at least one aspect of steering based on the torque command; and, in response to a determination that the mathematical sign of the compensation torque value is the same as the mathematical sign of the handwheel torque value: generate a torque command based on the compensation torque value and the handwheel torque value; and selectively control at least one aspect of steering based on the torque command.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
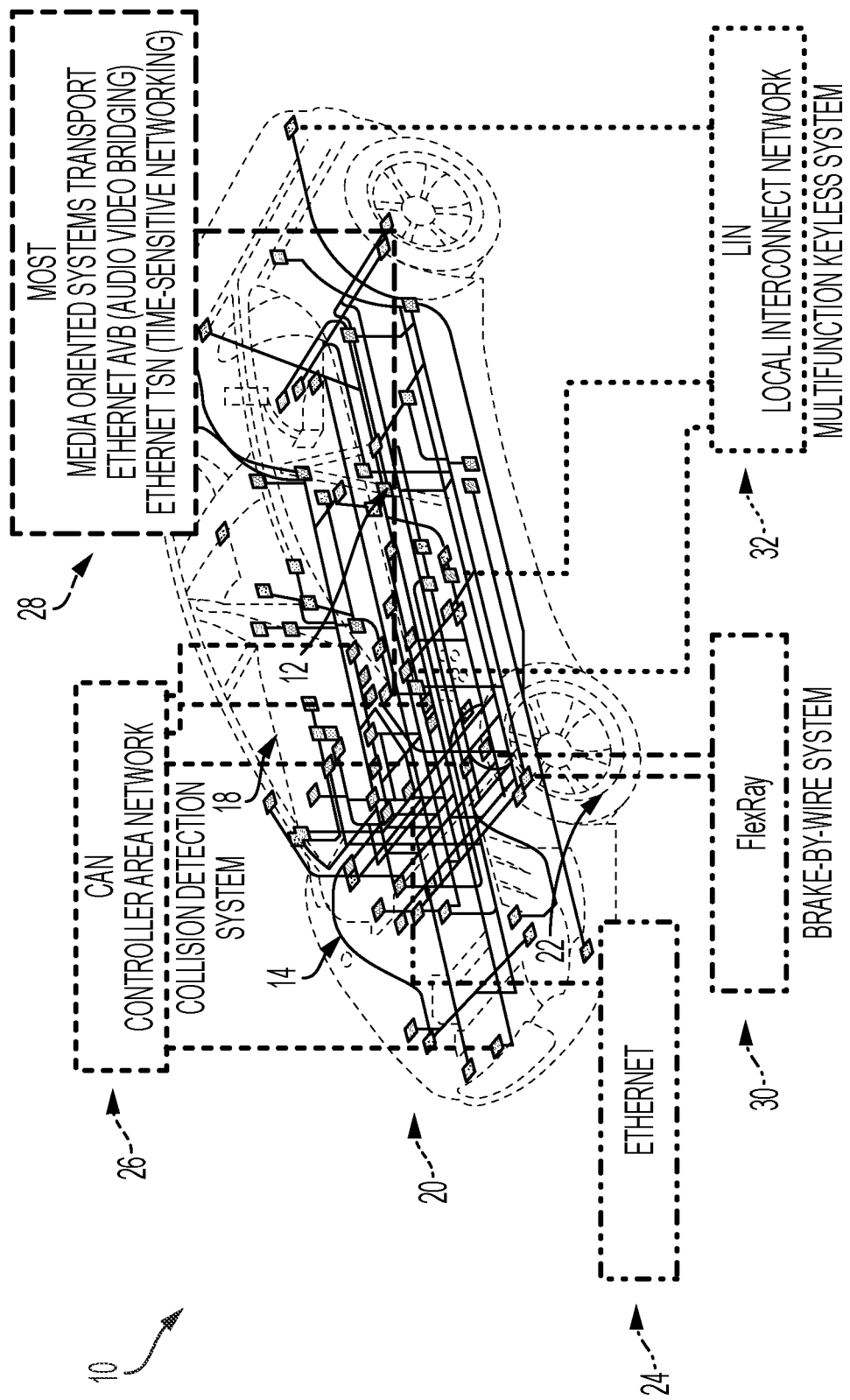
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, marine craft, aircraft, all-terrain vehicles, recreational vehicles, or other suitable vehicles, include a steering system, such as an electronic power steering (EPS) system, a steer-by-wire (SbW) steering system, a hydraulic steering system, or other suitable steering system. The steering system typically includes various torque paths for providing torque to various components of the steering system.

Typically, such steering systems may include or use one or more torque steering mitigation functions. Such torque steering mitigation functions may have calibrations set to quickly learn, which may allow for such torque steer mitigation functions to compensate for torque offsets due to transmission torque relatively quickly. However, this can cause the torque steer mitigation function to "over learn" on consecutive key cycles, because the learned gain may be stored as a 'long term gain' and on new key cycles, a 'short term gain' is learned (e.g., the gain of transmission torque to handwheel torque offset learned may become increase to an undesirable value). This can induce a pulling effect, which may be experienced by the operator of a vehicle in the opposite direction Accordingly, systems and methods, such as those described herein, configured to provide over learning protection for torque steer mitigation, may be desirable. In some embodiments, the systems and methods described herein may be configured to detect a difference in signs for a torque command for compensation and a handwheel torque. For example, an over-learning scenario creates a sign difference in the torque command for compensation and the handwheel torque (e.g., under normal conditions, the signs of the torque command for compensation and the handwheel torque are the same). Over-learning may be defined as a different sign on the calculated torque command and the handwheel torque signal.

In some embodiments, the systems and methods described herein may be configured to identify when a sign of the torque command is "flipped" (e.g., changed from one sign to another and/or differing from the sign of the handwheel torque), which may indicating over-learning. The systems and methods described herein may be configured to apply a ramp rate, which may prevent a sudden change in torque and may allow the torque it to ramp back towards a correct direction. The systems and methods described herein may be configured to decrease a learned gain for the steering system (e.g., because in an over-learning scenario, the learned gain has increased to an undesirable value).

In some embodiments, the systems and methods described herein may be configured to apply a filter to the torque command signal and/or the handwheel torque signal. The filter may be configured to prevent the systems and methods described herein from alternating between detecting over-learning and not detecting over-learning. For example, the torque command signal and the handwheel torque signal may be relatively small, which may result in the signs associated with the torque command signal and the handwheel torque signal changing at a relatively rapid pace (e.g., due to noise or dynamics in the steering system). The fitter may be configured to account for such small torque command signals and handwheel torque signals (e.g., and the rapid change signs associated with the small torque command signals and the small handwheel torque signals).

In some embodiments, the systems and methods described herein may be configured to detect, based on signal sign (e.g., corresponding to the torque command and the handwheel torque), over-learning. The system and methods described herein may be configured to provide mitigation for sign differences, ramp rate, and/or gain reduction.

In some embodiments, the systems and methods described herein may be configured to receive a compensation torque value. The systems and methods described herein may be configured to receive a handwheel torque value. The systems and methods described herein may be configured to detect a mathematical sign of the compensation torque value. The systems and methods described herein may be configured to detect a mathematical sign of the handwheel torque value. The systems and methods described herein may be configured to determine whether the mathematical sign of the compensation torque value is the same as the mathematical sign of the handwheel torque value.

In some embodiments, the systems and methods described herein may be configured to, in response to a determination that the mathematical sign of the compensation torque value is the same as the mathematical sign of the handwheel torque value, provide compensation according to a normal operation and apply ramp rates to prevent sudden changes in torque.

In some embodiments, the systems and methods described herein may be configured to, in response to a determination that the mathematical sign of the compensation torque value is not the same as the mathematical sign of the handwheel torque value, reduce learned gains and invert the mathematical sign of the compensation torque value. The systems and methods described herein may be configured to apply ramp rates to prevent sudden changes in torque.

In some embodiments, the systems and methods described herein may be configured to receive a compensation torque value corresponding to a torque offset associated with a transmission torque. The systems and methods described herein may be configured to receive a handwheel torque value associated with a handwheel of a steering system. The systems and methods described herein may be configured to detect a mathematical sign of the compensation torque value. The systems and methods described herein may be configured to detect a mathematical sign of the handwheel torque value. The systems and methods described herein may be configured to determine whether the mathematical sign of the compensation torque value is the same as the mathematical sign of the handwheel torque value.

The systems and methods described herein may be configured to, in response to a determination that the mathematical sign of the compensation torque value is not the same as the mathematical sign of the handwheel torque value, adjust one or more learned gains. For example, the systems and methods described herein may be configured to decrease or reduce the one or more learned gains corresponding to one or more historical compensation torque values. The systems and methods described herein may be configured to generate an inverted compensation torque value by inverting the mathematical sign of the compensation torque value.

In some embodiments, the systems and methods described herein may be configured to generate a torque command based on the inverted compensation torque value and the handwheel torque value and selectively control at least one aspect of steering based on the torque command. The systems and methods described herein may be configured to generate the torque command further based on one or more ramp rates associated with at least the inverted compensation torque value.

In some embodiments, the systems and methods described herein may be configured to, in response to a determination that the mathematical sign of the compensation torque value is the same as the mathematical sign of the handwheel torque value, generate a torque command based on the compensation torque value and the handwheel torque value, and selectively control at least one aspect of steering based on the torque command. The systems and methods described herein may be configured to generate the torque command further based on one or more ramp rates associated with at least the compensation torque value.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2A:
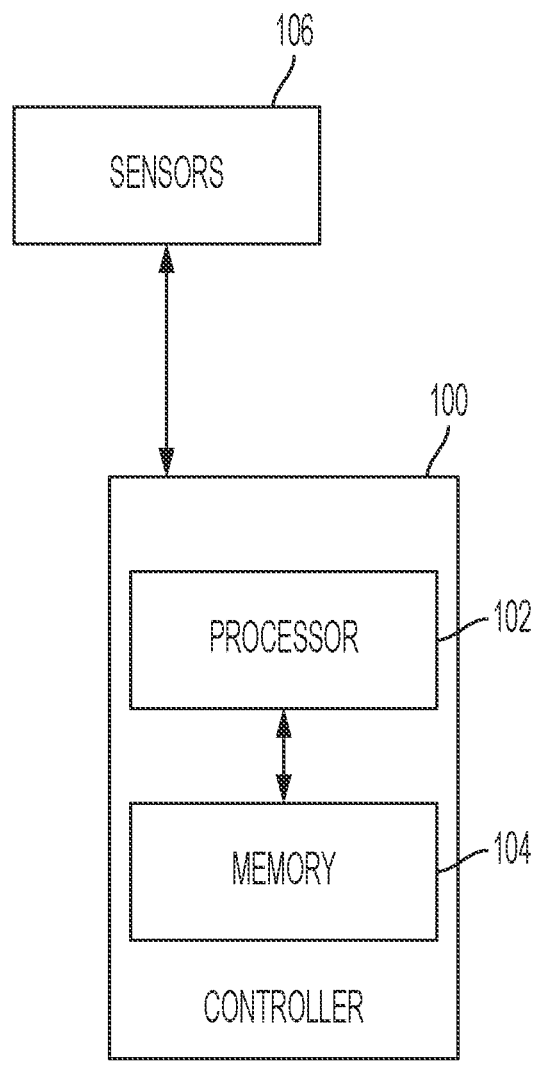
FIG. 2A generally illustrates an over learn protection system according to the principles of the present disclosure.

In some embodiments, the steering system may include a steering system controller, such as controller 100, as is generally illustrated in FIG. 2A. The controller 100 may include any suitable controller. The controller 100 may be configured to control, for example, the various functions of the steering system. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various functions of the steering system.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angel, a motor velocity, a vehicle speed, other suitable information, or a combination thereof.

In some embodiment, the controller 100 may be configured to detect over-learning and provide over-learning protection for torque steer mitigation. The controller 100 may receive a handwheel torque value. The handwheel torque value may correspond to an amount of torque applied to the handwheel of the vehicle 10. The controller 100 may receive the handwheel torque value from a sensor, such as the sensor 106 or other suitable sensor, configured to measure an amount of torque acting on the handwheel.

The controller 100 may receive and/or calculate a compensation torque value. The compensation torque value may correspond to a torque command calculated based on the handwheel torque value and/or other suitable values, signals, data, information, and the like. The controller 100 may detect a mathematical sign of the compensation torque value. The controller 100 may detect a mathematical sign of the handwheel torque value. The controller 100 may determine whether the mathematical sign of the compensation torque value is the same as the mathematical sign of the handwheel torque value.

In some embodiments, the controller 100 may in response to a determination that the mathematical sign of the compensation torque value is the same as the mathematical sign of the handwheel torque value, provide compensation according to a normal operation. The controller 100 may apply ramp rates to prevent sudden changes in torque.

In some embodiments, controller 100 may in response to a determination that the mathematical sign of the compensation torque value is not the same as the mathematical sign of the handwheel torque value, reduce learned gains and invert the mathematical sign of the compensation torque value. The controller 100 may apply ramp rates to prevent sudden changes in torque.

In some embodiments, the controller 100 may receive a compensation torque value corresponding to a torque offset associated with a transmission torque. The controller 100 may receive a handwheel torque value associated with a handwheel of a steering system. The controller 100 may detect a mathematical sign of the compensation torque value. The controller 100 may detect a mathematical sign of the handwheel torque value. The controller 100 may determine whether the mathematical sign of the compensation torque value is the same as the mathematical sign of the handwheel torque value.

The controller 100 may in response to a determination that the mathematical sign of the compensation torque value is not the same as the mathematical sign of the handwheel torque value, adjust one or more learned gains. For example, the controller 100 may decrease or reduce the one or more learned gains corresponding to one or more historical compensation torque values. The controller 100 may generate an inverted compensation torque value by inverting the mathematical sign of the compensation torque value.

In some embodiments, the controller 100 may generate a torque command based on the inverted compensation torque value and the handwheel torque value and selectively control at least one aspect of steering based on the torque command. The controller 100 may generate the torque command further based on one or more ramp rates associated with at least the inverted compensation torque value.

In some embodiments, the controller 100 may in response to a determination that the mathematical sign of the compensation torque value is the same as the mathematical sign of the handwheel torque value, generate a torque command based on the compensation torque value and the handwheel torque value, and selectively control at least one aspect of steering based on the torque command. The controller 100 may generate the torque command further based on one or more ramp rates associated with at least the compensation torque value.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 2B:
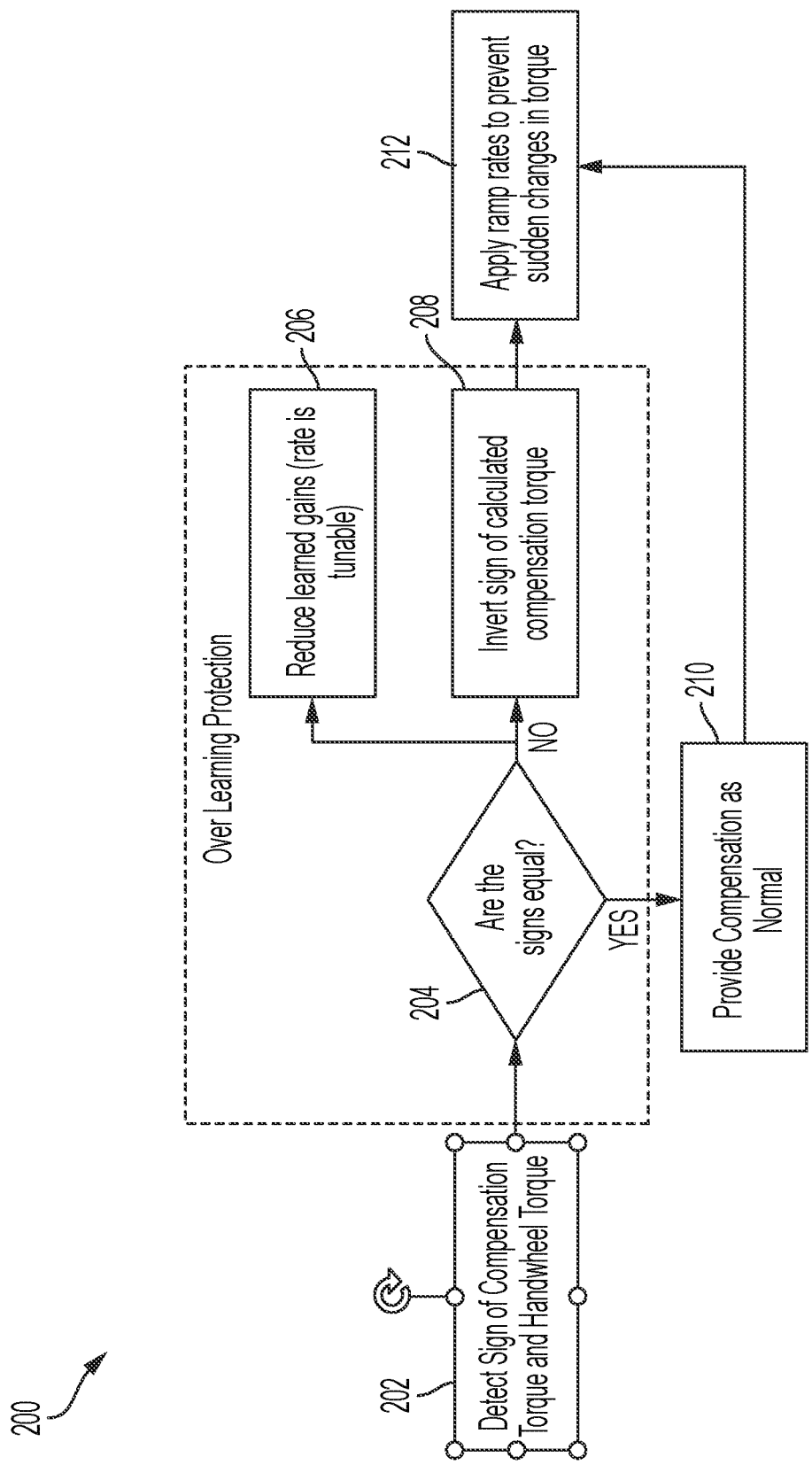
FIG. 2B is a flow diagram generally illustrating an over learn protection method according to the principles of the present disclosure.

FIG. 2B is a flow diagram generally illustrating an over learn protection method 200 according to the principles of the present disclosure. At 202, the method 200 detects a sign of a compensation torque and a handwheel torque. For example, the controller 100 may detect the sign of the compensation torque and the handwheel torque.

At 204, the method 200 determines whether the sign are equal. For example, the controller 100 may determine whether the sign of the compensation torque and the sign of the handwheel torque are the same. If the controller 100 determines that the sign of the compensation torque and the sign of the handwheel torque are the same, the method 200 continues at 210. Alternatively, if the controller 100 determines that the sign of the compensation torque and the sign of the handwheel torque are not the same, the method 200 continues at 206.

At 206, the method 200 reduces the learned gains. For example, the controller 100 may reduce the learned gains. It should be understood that the rate (e.g., of the learned gains) may be tunable.

At 208, the method 200 inverts the sign of the calculated compensation torque. For example, the controller 100 may invert the sign of the compensation torque (e.g., the calculated compensation torque). It should be understood that the method 200 may perform 206 and 208 in any suitable order or simultaneously (e.g., or substantially simultaneously).

At 210, the method 200 provides compensation as normal. For example, the controller 100 may provide compensation as normal (e.g., according to normal operations).

At 212, the method 200 may apply ramp rates to prevent sudden changes in toque. For example, the controller 100 may apply the ramp rates to prevent sudden change in torque.

Figure 3:
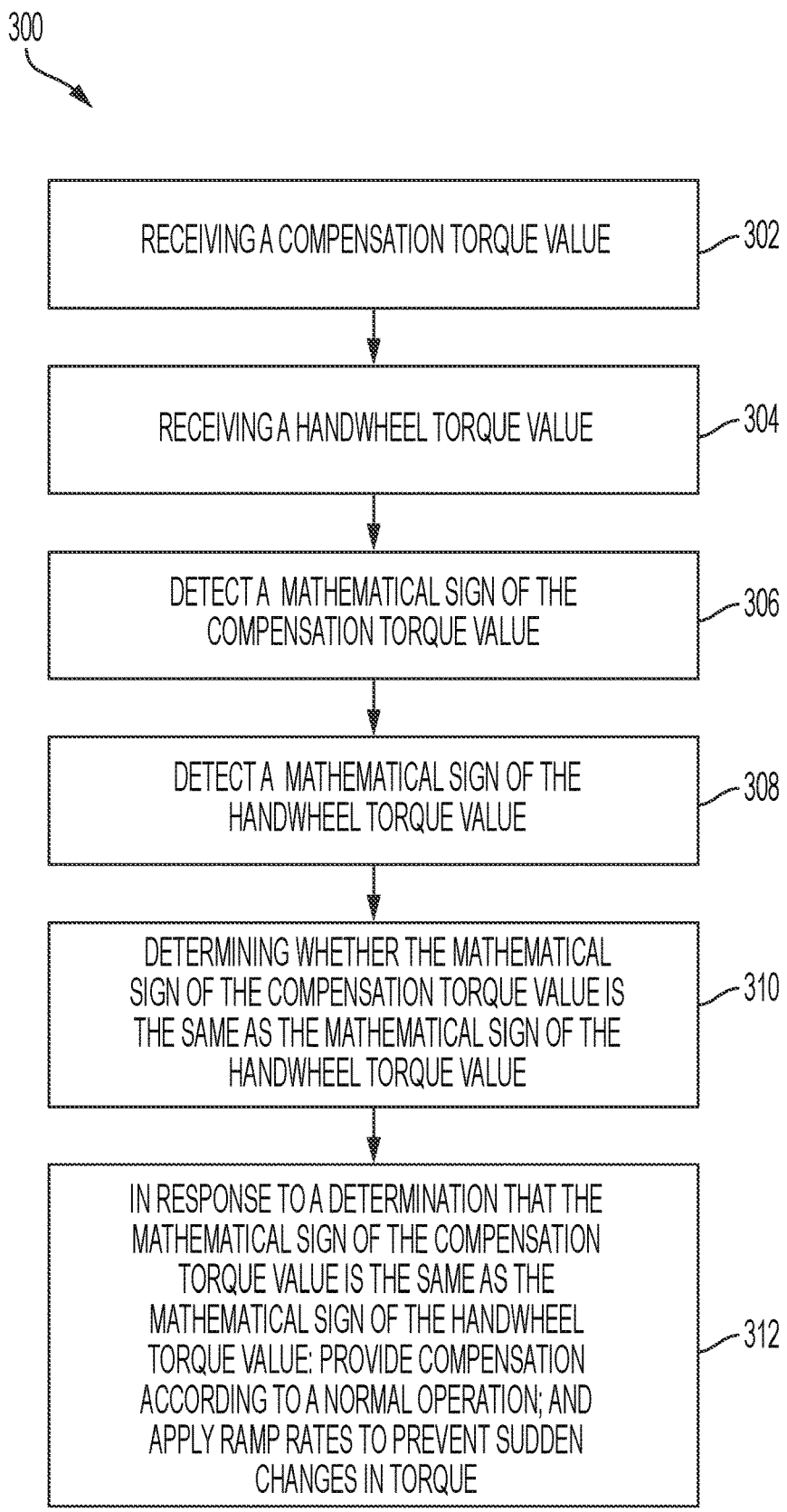
FIG. 3 is a flow diagram generally illustrating an alternative over learn protection method according to the principles of the present disclosure.

FIG. 3 is a flow diagram generally illustrating an alternative over learn protection method 300 according to the principles of the present disclosure. At 302, the method 300 receives a compensation torque value. For example, the controller 100 may receive the compensation torque value.

At 304, the method 300 receives a handwheel torque value. For example, the controller 100 may receive the handwheel torque value.

At 306, the method 300 detects a mathematical sign of the compensation torque value. For example, the controller 100 may detect the mathematical sign of the compensation torque value.

At 308, the method 300 detects a mathematical sign of the handwheel torque value. For example, the controller 100 may detect the mathematical sign of the handwheel torque.

At 310, the method 300 determines whether the mathematical sign of the compensation torque value is the same as the mathematical sign of the handwheel torque value. For example, the controller 100 may determine whether the mathematical sign of the compensation torque value is the same as the mathematical sign of the handwheel torque value.

At 312, the method 300, in response to a determination that the mathematical sign of the compensation torque value is the same as the mathematical sign of the handwheel torque value, provides compensation according to a normal operation and applies ramp rates to prevent sudden changes in torque. The controller 100 may in response to a determination that the mathematical sign of the compensation torque value is the same as the mathematical sign of the handwheel torque value, provide compensation according to a normal operation and apply ramp rates to prevent sudden changes in torque In some embodiments, the controller 100 may in response to a determination that the mathematical sign of the compensation torque value is not the same as the mathematical sign of the handwheel torque value, reduces learned gains and inverts the mathematical sign of the compensation torque value. In some embodiments, the controller 100 applies ramp rates to prevent sudden changes in torque.

Figure 4:
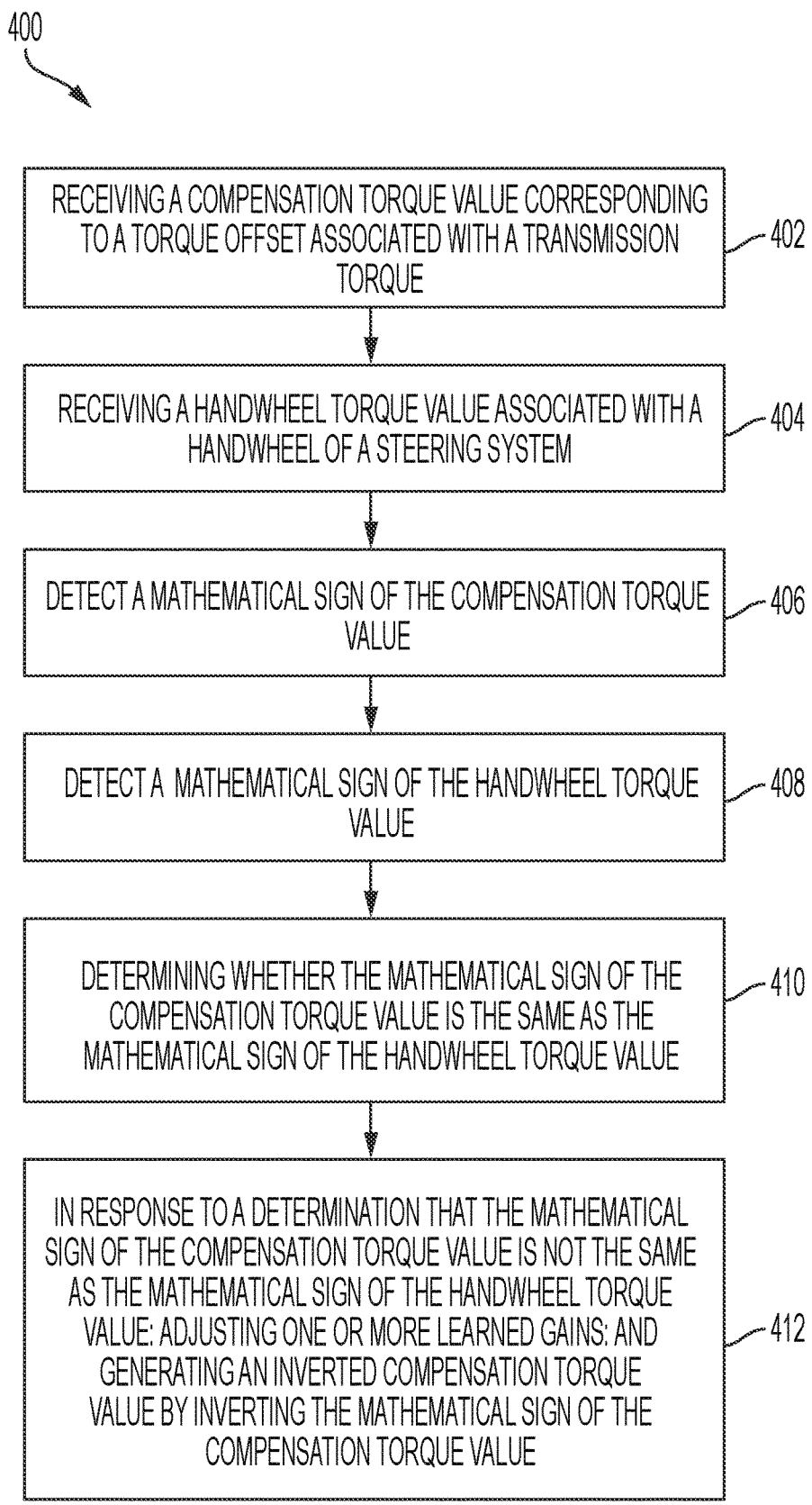
FIG. 4 is a flow diagram generally illustrating an alternative over learn protection method according to the principles of the present disclosure.

FIG. 4 is a flow diagram generally illustrating an alternative over learn protection method 400 according to the principles of the present disclosure. At 402, the method 400 receives a compensation torque value corresponding to a torque offset associated with a transmission torque. For example, the controller 100 may receive the compensation torque value.

At 404, the method 400 receives a handwheel torque value associated with a handwheel of a steering system. For example, the controller 100 may receive the handwheel torque value.

At 406, the method 400 detects a mathematical sign of the compensation torque value. For example, the controller 100 may detect the mathematical sign of the compensation torque value.

At 408, the method 400 detects a mathematical sign of the handwheel torque value. For example, the controller 100 may detect the mathematical sign of the handwheel torque.

At 410, the method 400 determines whether the mathematical sign of the compensation torque value is the same as the mathematical sign of the handwheel torque value. For example, the controller 100 may determine whether the mathematical sign of the compensation torque value is the same as the mathematical sign of the handwheel torque value.

At 412, the method 400, in response to a determination that the mathematical sign of the compensation torque value is not the same as the mathematical sign of the handwheel torque value, adjusts one or more learned gains and generates an inverted compensation torque value by inverting the mathematical sign of the compensation torque value. For example, the controller 100 may in response to a determination that the mathematical sign of the compensation torque value is not the same as the mathematical sign of the handwheel torque value, adjust the one or more learned gains and generate the inverted compensation torque value by inverting the mathematical sign of the compensation torque value. The controller 100 may generate a torque command based on the inverted compensation torque value and the handwheel torque value. The controller 100 may selectively control at least one aspect of steering based on the torque command In some embodiments, a system for providing over learn protection for torque steer mitigation incudes a processor and a memory. The memory includes instructions that, when executed by the processor, cause the processor to; receive a compensation torque value; receive a handwheel torque value; detect a mathematical sign of the compensation torque value; detect a mathematical sign of the handwheel torque value; determine whether the mathematical sign of the compensation torque value is the same as the mathematical sign of the handwheel torque value; in response to a determination that the mathematical sign of the compensation torque value is the same as the mathematical sign of the handwheel torque value, provide compensation according to a normal operation and apply ramp rates to prevent sudden changes in torque.

In some embodiments, the instructions further cause the processor to, in response to a determination that the mathematical sign of the compensation torque value is not the same as the mathematical sign of the handwheel torque value, reduce learned gains and invert the mathematical sign of the compensation torque value. In some embodiments, the instructions further cause the processor to apply ramp rates to prevent sudden changes in torque.

Clause 1. A method for providing over learn protection for torque steer mitigation, the method comprising: receiving a compensation torque value corresponding to a torque offset associated with a transmission torque; receiving a handwheel torque value associated with a handwheel of a steering system; detecting a mathematical sign of the compensation torque value; detecting a mathematical sign of the handwheel torque value; determining whether the mathematical sign of the compensation torque value is the same as the mathematical sign of the handwheel torque value; in response to a determination that the mathematical sign of the compensation torque value is not the same as the mathematical sign of the handwheel torque value: adjusting one or more learned gains; and generating an inverted compensation torque value by inverting the mathematical sign of the compensation torque value.

Clause 2. The method of one or more of the clauses described herein, further comprising: generating a torque command based on the inverted compensation torque value and the handwheel torque value; and selectively controlling at least one aspect of steering based on the torque command.

Clause 3. The method of one or more of the clauses described herein, wherein the torque command is further based on one or more ramp rates associated with at least the inverted compensation torque value.

Clause 4. The method of one or more of the clauses described herein, further comprising, in response to a determination that the mathematical sign of the compensation torque value is the same as the mathematical sign of the handwheel torque value: generating a torque command based on the compensation torque value and the handwheel torque value; and selectively controlling at least one aspect of steering based on the torque command.

Clause 5. The method of one or more of the clauses described herein, wherein the torque command is further based on one or more ramp rates associated with at least the compensation torque value.

Clause 6. The method of one or more of the clauses described herein, wherein the steering system includes an electronic power steering system.

Clause 7. The method of one or more of the clauses described herein, wherein the steering system includes a steer-by-wire steering system.

Clause 8. The method of one or more of the clauses described herein, wherein adjusting one or more learned gains includes decreasing the one or more learned gains.

Clause 9. The method of one or more of the clauses described herein, wherein the one or more learned gains correspond to one or more historical compensation torque values.

Clause 10. A system for providing over learn protection for torque steer mitigation, the system comprising: a processor; and a memory including instructions that, when executed by the processor, cause the processor to: receive a compensation torque value corresponding to a torque offset associated with a transmission torque; receive a handwheel torque value associated with a handwheel of a steering system; detect a mathematical sign of the compensation torque value; detect a mathematical sign of the handwheel torque value; determine whether the mathematical sign of the compensation torque value is the same as the mathematical sign of the handwheel torque value; in response to a determination that the mathematical sign of the compensation torque value is not the same as the mathematical sign of the handwheel torque value: adjust one or more learned gains; and generate an inverted compensation torque value by inverting the mathematical sign of the compensation torque value.

Clause 11. The system of one or more of the clauses described herein, wherein the instructions further cause the processor to: generate a torque command based on the inverted compensation torque value and the handwheel torque value; and selectively control at least one aspect of steering based on the torque command.

Clause 12. The system of one or more of the clauses described herein, wherein the instructions cause the processor to generate the torque command further based on one or more ramp rates associated with at least the inverted compensation torque value.

Clause 13. The system of one or more of the clauses described herein, wherein the instructions further cause the processor to, in response to a determination that the mathematical sign of the compensation torque value is the same as the mathematical sign of the handwheel torque value: generate a torque command based on the compensation torque value and the handwheel torque value; and selectively control at least one aspect of steering based on the torque command.

Clause 14. The system of one or more of the clauses described herein, wherein the instructions further cause the processor to generate the torque command further based on one or more ramp rates associated with at least the compensation torque value.

Clause 15. The system of one or more of the clauses described herein, wherein the steering system includes an electronic power steering system.

Clause 16. The system of one or more of the clauses described herein, wherein the steering system includes a steer-by-wire steering system.

Clause 17. The system of one or more of the clauses described herein, wherein the instructions further cause the processor to adjust one or more learned gains by decreasing the one or more learned gains.

Clause 18. The system of one or more of the clauses described herein, wherein the one or more learned gains correspond to one or more historical compensation torque values.

Clause 19. An apparatus for providing over learn protection for torque steer mitigation, the apparatus comprising: a processor; and a memory including instructions that, when executed by the processor, cause the processor to: receive a compensation torque value corresponding to a torque offset associated with a transmission torque; receive a handwheel torque value associated with a handwheel of a steering system; detect a mathematical sign of the compensation torque value; detect a mathematical sign of the handwheel torque value; determine whether the mathematical sign of the compensation torque value is the same as the mathematical sign of the handwheel torque value; in response to a determination that the mathematical sign of the compensation torque value is not the same as the mathematical sign of the handwheel torque value: adjust one or more learned gains; generate an inverted compensation torque value by inverting the mathematical sign of the compensation torque value; generate a torque command based on the inverted compensation torque value and the handwheel torque value; and selectively control at least one aspect of steering based on the torque command; and, in response to a determination that the mathematical sign of the compensation torque value is the same as the mathematical sign of the handwheel torque value: generate a torque command based on the compensation torque value and the handwheel torque value; and selectively control at least one aspect of steering based on the torque command.

Clause 20. The apparatus of one or more of the clauses described herein, wherein the instructions further cause the processor to generate the torque command further based on one or more ramp rates associated with at least the compensation torque value.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A method for providing over learn protection for torque steer mitigation, the method comprising:
   detecting a mathematical sign of a compensation torque value corresponding to a torque offset;
   detecting a mathematical sign of a handwheel torque value associated with a steering system; and
   in response to a determination that the mathematical sign of the compensation torque value is not the same as the mathematical sign of the handwheel torque value, generating an inverted compensation torque value by inverting the mathematical sign of the compensation torque value.

2. The method of claim 1, further comprising:
   generating a torque command based on the inverted compensation torque value and the handwheel torque value; and
   selectively controlling at least one aspect of steering based on the torque command.

3. The method of claim 2, wherein the torque command is further based on one or more ramp rates associated with at least the inverted compensation torque value.

4. The method of claim 1, further comprising, in response to a determination that the mathematical sign of the compensation torque value is the same as the mathematical sign of the handwheel torque value:
   generating a torque command based on the compensation torque value and the handwheel torque value; and
   selectively controlling at least one aspect of steering based on the torque command.

5. The method of claim 4, wherein the torque command is further based on one or more ramp rates associated with at least the compensation torque value.

6. The method of claim 1, wherein the steering system includes an electronic power steering system.

7. The method of claim 1, wherein the steering system includes a steer-by-wire steering system.

8. The method of claim 1, further comprising, further in response to the determination that the mathematical sign of the compensation torque value is not the same as the mathematical sign of the handwheel torque value, adjusting one or more learned gains.

9. The method of claim 8, wherein adjusting one or more learned gains includes decreasing the one or more learned gains.

10. The method of claim 8, wherein the one or more learned gains correspond to one or more historical compensation torque values.

11. A system for providing over learn protection for torque steer mitigation, the system comprising:
    a processor; and
    a memory including instructions that, when executed by the processor, cause the processor to:
    detect a mathematical sign of a compensation torque value corresponding to a torque offset;
    detect a mathematical sign of a handwheel torque value associated with a steering system; and
    in response to a determination that the mathematical sign of the compensation torque value is not the same as the mathematical sign of the handwheel torque value, generate an inverted compensation torque value by inverting the mathematical sign of the compensation torque value.

12. The system of claim 1, further comprising:
generating a torque command based on the inverted compensation torque value and the handwheel torque value; and
selectively controlling at least one aspect of steering based on the torque command.

13. The system of claim 12, wherein the torque command is further based on one or more ramp rates associated with at least the inverted compensation torque value.

14. The system of claim 11, wherein the instructions further cause the processor to, in response to a determination that the mathematical sign of the compensation torque value is the same as the mathematical sign of the handwheel torque value:
generate a torque command based on the compensation torque value and the handwheel torque value; and
selectively control at least one aspect of steering based on the torque command.

15. The system of claim 14, wherein the torque command is further based on one or more ramp rates associated with at least the compensation torque value.

16. The system of claim 11, wherein the steering system includes an electronic power steering system.

17. The system of claim 11, wherein the steering system includes a steer-by-wire steering system.

18. The system of claim 11, wherein the instructions further cause the processor to, further in response to the determination that the mathematical sign of the compensation torque value is not the same as the mathematical sign of the handwheel torque value, adjust one or more learned gains.

19. The system of claim 18, wherein adjusting one or more learned gains includes decreasing the one or more learned gains.

20. An apparatus for providing over learn protection for torque steer mitigation, the apparatus comprising:
a controller configured to:
detect a mathematical sign of a compensation torque value corresponding to a torque offset;
detect a mathematical sign of a handwheel torque value; and
in response to a determination that the mathematical sign of the compensation torque value is not the same as the mathematical sign of the handwheel torque value, at least one of:
generate an inverted compensation torque value by inverting the mathematical sign of the compensation torque value; and
adjust one or more learned gains.

* * * * *